(12) United States Patent
Schmidt et al.

(10) Patent No.: US 7,509,851 B1
(45) Date of Patent: Mar. 31, 2009

(54) PLASMA ARCJET TUNNEL SEGMENTS AND METHOD OF MAKING SAME

(75) Inventors: Eric E. Schmidt, Adelanto, CA (US); Elias Wade Wilson, Adelanto, CA (US)

(73) Assignee: Exquadrum, Inc., Adelanto, CA (US)

( * ) Notice: Subject to any disclaimer, the term of this patent is extended or adjusted under 35 U.S.C. 154(b) by 0 days.

(21) Appl. No.: 11/981,468

(22) Filed: Oct. 30, 2007

(51) Int. Cl.
*G01M 9/00* (2006.01)
(52) U.S. Cl. ....................................... 73/147
(58) Field of Classification Search ............. 73/147
See application file for complete search history.

(56) References Cited

U.S. PATENT DOCUMENTS 4,283,276 A * 8/1981 Grant .......................... 209/155
5,672,821 A * 9/1997 Suzuki ......................... 73/202
6,929,397 B2 * 8/2005 Ren ............................ 374/208

* cited by examiner

*Primary Examiner*—Andre J Allen
*Assistant Examiner*—Jermaine Jenkins
(74) *Attorney, Agent, or Firm*—Townsend & Banta

(57) ABSTRACT

A plasma heated arcjet wind tunnel is provided with tunnel segments in the arc-constrictor. The tunnel segments are fabricated of two concentric discs, an outer disc and an inner disc, with a groove formed in an outer edge of the inner disc. The two concentric discs which fit snugly into one another and are joined at their welded interface by a straight and angled butt joint formed between an inner edge of the outer disc and an outer edge of the inner disc. The straight and angled butt joints can be welded by electron beam welding, laser welding, or friction stir welding.

20 Claims, 10 Drawing Sheets

PLASMA ARCJET TUNNEL SEGMENTS AND METHOD OF MAKING SAME

The following described invention was made under United States government contract FA9101-04-M-0013 and FA9101-05-C-0040.

BACKGROUND OF THE INVENTION

1. Field of the Invention

The present invention relates in general to plasma heated arcjet wind tunnels used in the testing of aerospace components and vehicles and, more particularly, to a water-cooled plasma arcjet tunnel segment and method of making same. The arcjet tunnel segments are used to form a wind tunnel used for constricting plasma flow, and effecting an elevation of the temperature in the wind tunnel to simulate conditions encountered in high speed flight.

2. Description of the Related Art

A conventional plasma arcjet heated wind tunnel is typified by the 60-MW shuttle interaction heating facility at Ames Research Center, Moffett Field, Calif., which is a continuous flow electric heated hypersonic wind tunnel system. This facility, which is capable of simulating aerodynamic heating over a broad range of conditions, is shown schematically in FIG. 1. The major components of this facility, shown generally at 1 in FIG. 1, include an arcjet air heater 3 for producing high temperature air, a 60-MW power supply 5, an interchangeable hypersonic Mach number nozzle 7, a walk-in test chamber 11, and an ansillary subsystem consisting of a steam-ejector vacuum system 9, an air control system 13, and a cooling water system 15, 11 (FIG. 1).

A primary component of such a facility is the high power, constricted arc heater for producing high temperature air for the nozzles. In such heaters, a long high voltage discharge occurs between two electrode assemblies. The arc current is high so that it becomes constricted by the confining constrictor tube. This constriction causes the arc-column temperature to rise to very high levels, for example, to 10,000° K. The constrictor tube consists of a plurality of discs, which may be fabricated in modular form and comprise, for example, thirty discs—each only 1 cm thick and 8 cm in diameter. In the 60-MW plasma arcjet tunnel the constructor tube is 3.9-m large.

A clear plastic material may be used as a potting agent on each module holding the discs in position. The assembly is easily sealed for high pressure operation, and possesses good dielectric properties for avoiding arc-over due to high voltage gradients.

A conventional constrictor-disc is shown generally at 17 in FIG. 2. The disc 17 is water cooled by a source of water entering at 19 and exiting at 21. The cooling water flows from peripheral entrance 23 of the outer disc 25 to passageway 27, and then into and around a cusp-shaped water passageway 29 formed in inner ring 31. The purpose of the cusp is to induce a centripetal pressure gradiant within the water cooling passage 29. This gradiant, thought to be essential, causes nucleate boiling bubbles to rise from the surface.

The cross-sectional view, FIG. 3, taken along line 3-3 in FIG. 2, illustrates the flow of air into the constrictor disc through air passage 33. A disc filler 35 is shown in FIG. 3 adjacent to outer disc 25, as well as o-ring seals 37, and backup ring (insulated) 39. The air flow out is shown at 36. Operating experience at high heating conditions evolved the construction techniques using the undulating cusp-shaped water passage 29, and a one-piece spool and filler design shown in the sectional disc assembly shown in FIGS. 2 and 3.

Conventional water-cooled arcjet tunnel segments are disc shaped pieces of copper that provide physical spacing between an anode and cathode in a plasma heated wind tunnel. The physical spacing between the anode (at the inlet of the tunnel) and cathode (at the exit of the tunnel) allows a significant electrical potential to occur, which in turn, is discharged in the tunnel in the form of a plasma arc. This arc heats the incoming high-pressure working fluid, which is usually air, but can be helium, or a mixture of gases. The tunnel segments are water-cooled to survive in the demanding thermal environment produced through the proximity of the segments to the plasma arcjet process. A high pressure flow of the working fluid is introduced between the segments in a swirling fashion to aid in centering the arcjet and cooling the segments, while also providing a significant portion of the total working fluid that is ejected from the hypersonic nozzle.

The primary disadvantage of the current design, as shown in FIGS. 2 and 3, is in its fabrication requirements which requires the use of a silver solder, and vacuum oven brazing. This process is often referred to as "black magic" in the aerospace industry due to the high degree of personal experience required by the fabricator to produce repeatable and reliable products from production run to production run. Depending on the complexity of the geometry of the parts that are to be joined (e.g. area to be brazed, braze interface, braze gap, etc) and the material to be brazed, the degree of difficulty in the vacuum brazing goes up significantly with a commensurate increase in the number of scrap or failed parts. As the number of failed parts increases, the cost per satisfactory part increases as well.

In the case of the current segment design, three (3) parts are brazed together requiring a very deep turning operation and a high level of alignment to ensure that there is a consistent and properly sized braze joints to allow the silver solder to flow at temperature. Positioning the silver solder foil between the individual parts and ensuring that the solder flows evenly in the gap is a substantial hurdle to low part count rejection rates. Repeatability of the braze joint interface, alignment and foil placement are highly subject to human error, and, are therefore highly dependent on the fabricator. In addition, the vacuum oven process itself requires specific tailoring and manipulation on a part by part basis to ensure the proper process variables (e.g., vacuum level, oven temperature, time, etc.).

It is therefore an object of the present invention to provide a plasma arcjet tunnel segment and process of producing same that eliminates this level of individual fabricator experience, and improves the repeatability of the fabrication process therefor.

It is another object of the present invention to provide improved plasma arcjet tunnel segments and process of producing same which eliminates welding slag and brazing materials flow into the water channel, and which segments can withstand the high thermal and pressure extremes encountered in operation.

It is yet another object of the present invention to provide a plasma heated arcjet wind tunnel with tunnel segments in the arc constrictor which overcome operating problems of the conventional tunnel segments.

BRIEF SUMMARY OF THE INVENTION

Through considerable experimentation, the present inventors unexpectedly discovered an improved plasma arcjet tunnel segment and process of producing same. The plasma arcjet tunnel segments of the present invention are fabricated from only two concentric discs which are joined at a weld interface defined by two distinct weld joints: a straight butt joint and an angled butt joint. This joint forms a unitary structure from the two concentric discs.

Specific features of the tunnel segments of the present invention is the use of only two concentric discs joined by a straight butt joint and an angled butt joint to allow the two pieces to join into one single unit and define an arcjet heater segment. Both the use of only two concentric discs to make up the final assembly, and the welded straight butt and the angled butt joint interface of the resulting tunnel segment was found to overcome the problems encountered with conventional tunnel setments.

In a first embodiment of the present invention there is provided a plasma heated arcjet wind tunnel comprising a plurality of spaced disc shaped tunnel segments that provide spacing between an anode and cathode in a plasma heated tunnel, the improvement comprising:

tunnel segments comprising two concentric discs each having a central bore, a larger outer disc and a smaller inner disc which fits snugly in the central bore of the larger outer disc, each disc having inner and outer edge surfaces and substantially parallel top and bottom surfaces, the inner disc having a groove formed in its outer edge, the outer disc having an internal radial passage extending from its outer edge to its inner edge and the groove formed in the outer edge of the inner disc, said inner and outer concentric discs being joined at a welded interface comprising a straight butt joint and an angled butt joint, said joints withstanding the passage of high pressure coolant flow, at the straight and angled butt joint all edge surfaces of the inner and outer discs are in abutting engagement except at the groove.

In a second embodiment of the present invention there is provided a plasma heated arcjet wind tunnel having an arcjet plasma segment formed at least in part from oxygen free copper or copper alloy, or combination of copper alloys and corrosion resistant steels.

In a third embodiment of the present invention there is provided a plasma heated arcjet wind tunnel having an arcjet wind tunnel segment with a central bore accommodating the flow of a plasma in the plasma heated arcjet wind tunnel.

In a fourth embodiment of the present invention there is provided a plasma heated arcjet wind tunnel having arcjet tunnel segments wherein the straight and angled butt joint are joined using any electron beam welding, laser welding and friction stir welding, etc.

In a fifth embodiment of the present invention there is provided a plasma heated arcjet wind tunnel having an arcjet tunnel segment wherein at the straight and angled butt joints a first surface of the inner edge of the larger disc extends entirely across and walls of the groove formed in an outer edge of the inner disc, whereby to form a circular coolant passageway.

In a sixth embodiment of the present invention there is provided a plasma heated arcjet wind tunnel having an arcjet tunnel segment wherein at the straight and angled butt joints a second surface of the inner edge of the larger disc extends from an outer side of the larger disc at an angle of from about 30 to 60 degrees.

In a seventh embodiment of the present invention there is provided a plasma heated arcjet wind tunnel having an arcjet tunnel segment wherein at the straight and angled butt joints a third surface of the inner edge of the larger disc includes a recess or corner which is in abutting engagement with a shoulder formed on an outer edge of the inner disc, said third surface of the inner edge extending from an outer surface of the larger disc to said recess or corner.

In a eighth embodiment of the present invention there is provided a plasma heated arcjet wind tunnel with arcjet tunnel segments wherein at the straight and angled butt joints the first surface is larger than the groove and extends from the groove to the second surface at the inner edge.

In a ninth embodiment of the present invention there is provided a plasma heated arcjet wind tunnel having arcjet tunnel segments wherein at the straight and angled butt joints:

(a) a first surface of the inner edge of the larger disc extends entirely across and walls of a groove formed in an outer edge of the inner disc, whereby to form a circular coolant passageway, (b) a second surface of the inner edge of the larger disc extends from an outer side of the larger disc at an angle of from about 30 to 60 degrees, (c) a third surface of the inner edge of the larger disc includes a recess or corner which is in abutting engagement with a shoulder formed on an outer edge of the inner disc, said third surface extending from an outer surface of the larger disc, (d) the first surface of the inner edge is larger than the groove and extends from the groove to the second surface.

In a tenth embodiment of the present invention there is provided arcjet tunnel segments comprising two concentric discs each having a central bore, a larger outer disc and a smaller inner disc which fits snugly in a central bore of the larger outer disc, each disc having inner and outer edge surfaces and substantially parallel top and bottom surfaces, the inner disc having a groove formed in its outer edge, the outer disc having an internal radial passage extending from its outer edge to its inner edge and communicating with the groove formed in the outer edge of the inner disc, said inner and outer concentric discs being joined by welded straight and angled butt joints so as to withstand the passage of high pressure coolant flow, at the straight and angled butt joints all edge surfaces of the inner and outer discs are in abutting engagement except at the groove.

In an eleventh embodiment of the present invention there is provided arcjet tunnel segments wherein the tunnel segment is formed at least in part from oxygen free copper, copper alloy, or combination of copper alloys and corrosion resistant steels.

In a twelfth embodiment of the present invention there is provided an arcjet tunnel segment wherein the bore in the center of the smaller disc accommodates the flow of a plasma in a plasma heated arcjet wind tunnel.

In a thirteenth embodiment of the present invention there is provided an arcjet tunnel segment wherein straight and angled butt joints are joined using electron beam welding, laser welding, or friction stir welding.

In a fourteenth embodiment of the present invention there is provided an arcjet tunnel segment wherein at the straight and angled butt joint a first surface of the inner edge of the larger disc extends entirely across and walls off the groove formed in an outer edge of the inner disc, whereby to close off the groove and form a circular coolant passageway.

In a fifteenth embodiment of the present invention there is provided an arcjet tunnel segment wherein at the straight and angled butt joint a second surface of the inner edge of the larger disc extends from an outer side of the larger disc at an angle of from about 30 to 60 degrees.

In a sixteenth embodiment of the present invention there is provided an arcjet tunnel segment wherein at the straight and angled butt joint a third surface of the inner edge of the larger disc includes a recess or corner which is in abutting engagement with a shoulder formed on an outer edge of the inner disc, said third surface of the inner edge extending from an outer surface of the larger disc to said recess or corner.

In a seventeenth embodiment of the present invention there is provided an arcjet tunnel segment wherein at the straight and angled butt joints the first surface of the inner edge is larger than the groove and extends from the groove to the second surface.

In an eighteenth embodiment of the present invention there is provided an arcjet tunnel segment wherein at the straight and angled butt joints:

(a) a first surface of the inner edge of the larger disc extends entirely across and walls off a groove formed in an outer edge of the inner disc, whereby to form a circular coolant passageway, (b) a second surface of the inner edge of the larger disc extends from an outer side of the larger disc at an angle of from about 30 to 60 degrees, (c) a third surface of the inner edge of the larger disc includes a recess or corner which is in abutting engagement with a shoulder formed on an outer edge of the inner disc, said third surface of the inner edge extending from an outer surface of the larger disc to said recess or corner, and (d) the first surface of the inner edge is larger than the groove and extends from the groove to the second surface of the inner edge.

In a nineteenth embodiment of the present invention there is provided an arcjet tunnel segment wherein both the inner and outer discs are circular.

In a twentieth embodiment of the present invention there is provided an arcjet tunnel segment wherein the straight and angled butt joints are joined by electron beam welding, laser welding, or friction stir welding.

DETAILED DESCRIPTION OF THE INVENTION

Figure 1:
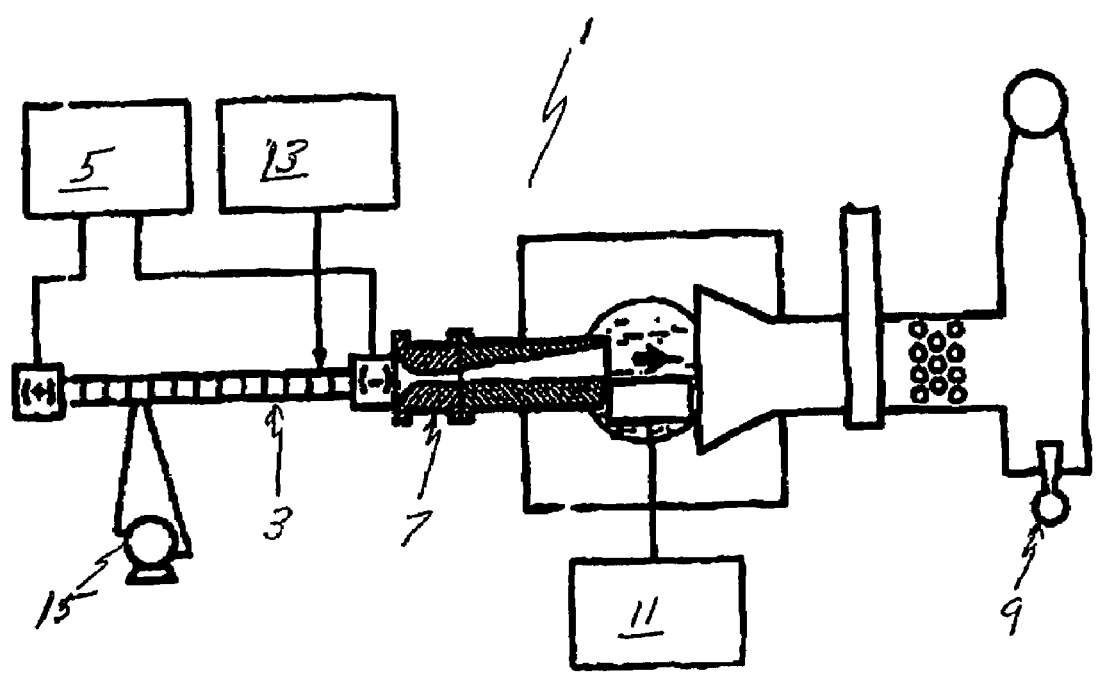
FIG. 1 is a schematic diagram illustrating a 60-MW shuttle interaction heating facility which incorporates a constricted arc heater using conventional water-cooled tunnel segments.
Figures 2, 3:
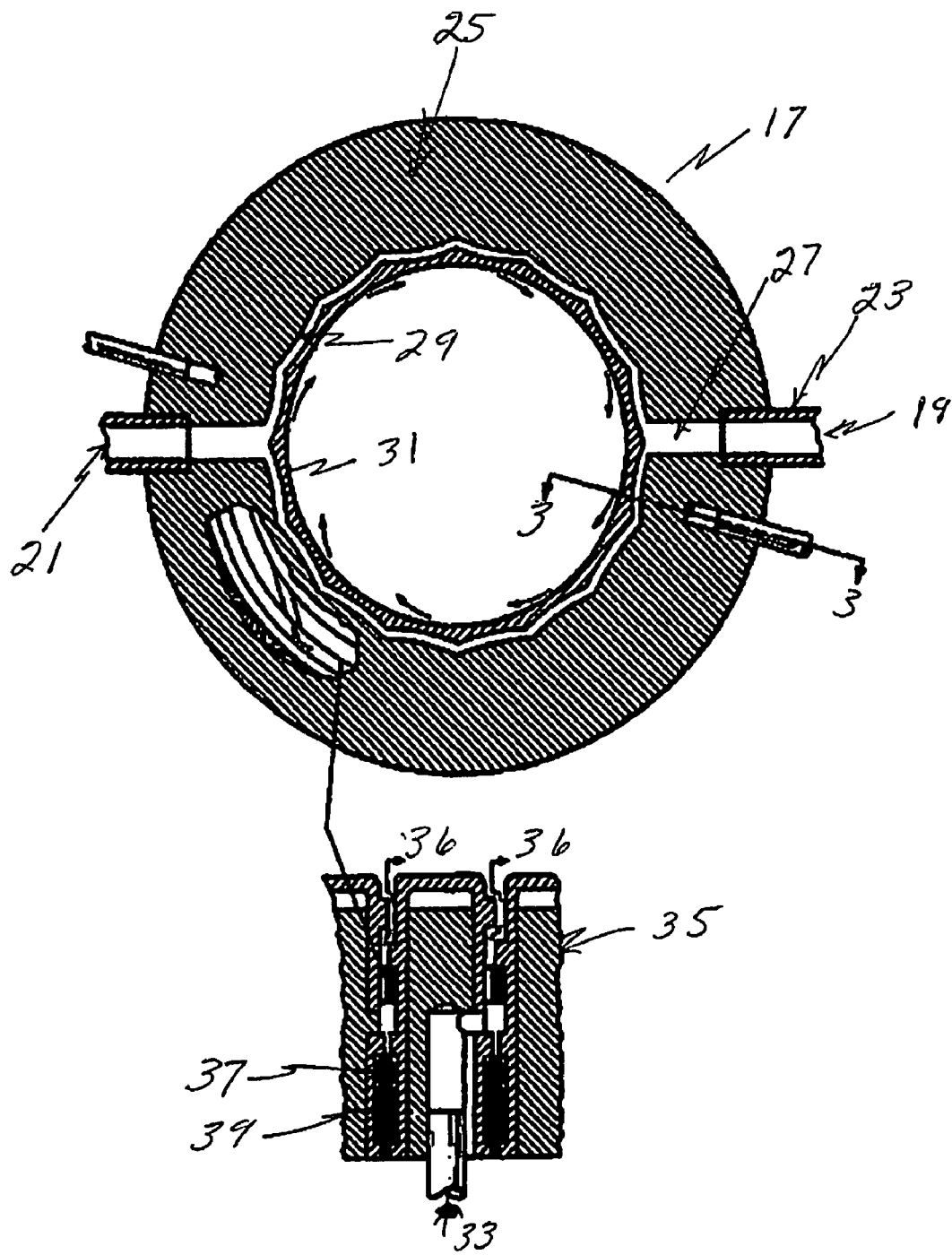
FIG. 2 is a top view of a conventional water cooled tunnel segment illustrating the cusp-shaped water cooling passageway.
FIG. 3 is a cross-sectional view, taken along line 3-3 in FIG. 2, illustrating the internal construction of a conventional water-cooled tunnel segment.
Figure 4:
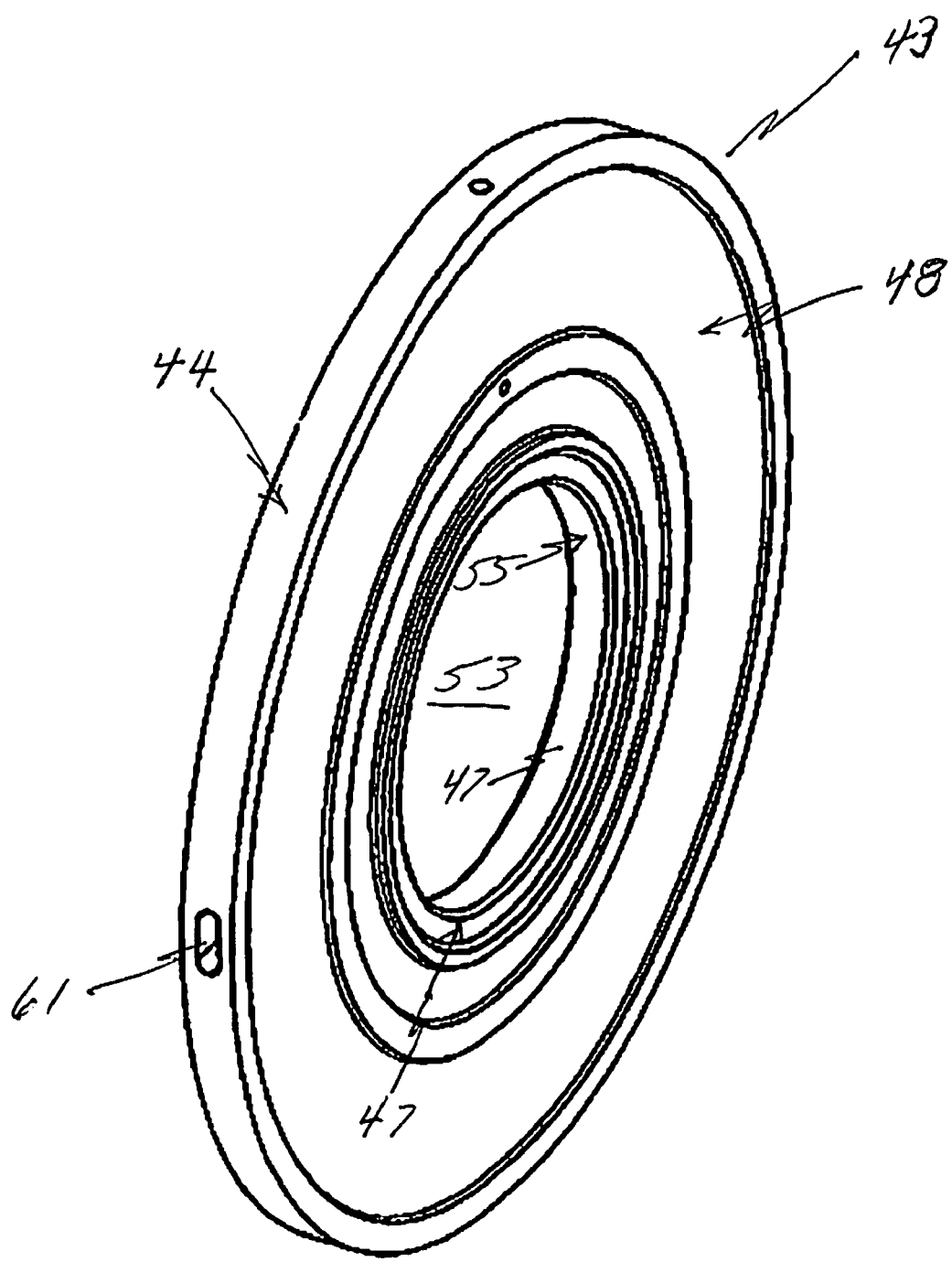
FIG. 4 is a perspective view of a tunnel segment of the present invention, illustrating inner and outer concentric discs and a cooling water entrance.
Figure 5:
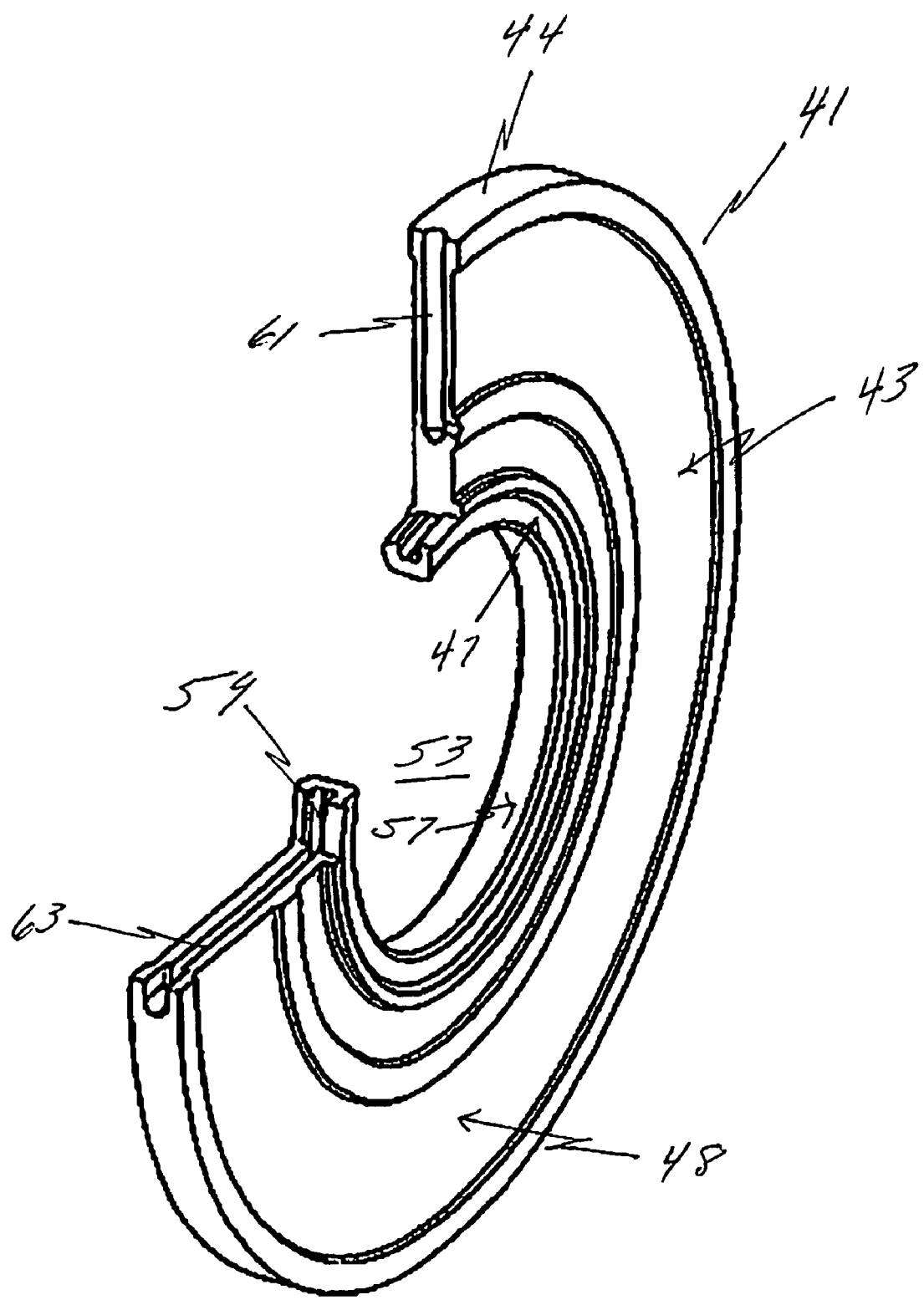
FIG. 5 is a perspective view, partially cut away, of a tunnel segment of the present invention shown in FIG. 4, illustrating the inner and outer discs, and a radially extending internal water passage in the outer disc.
Figure 8:
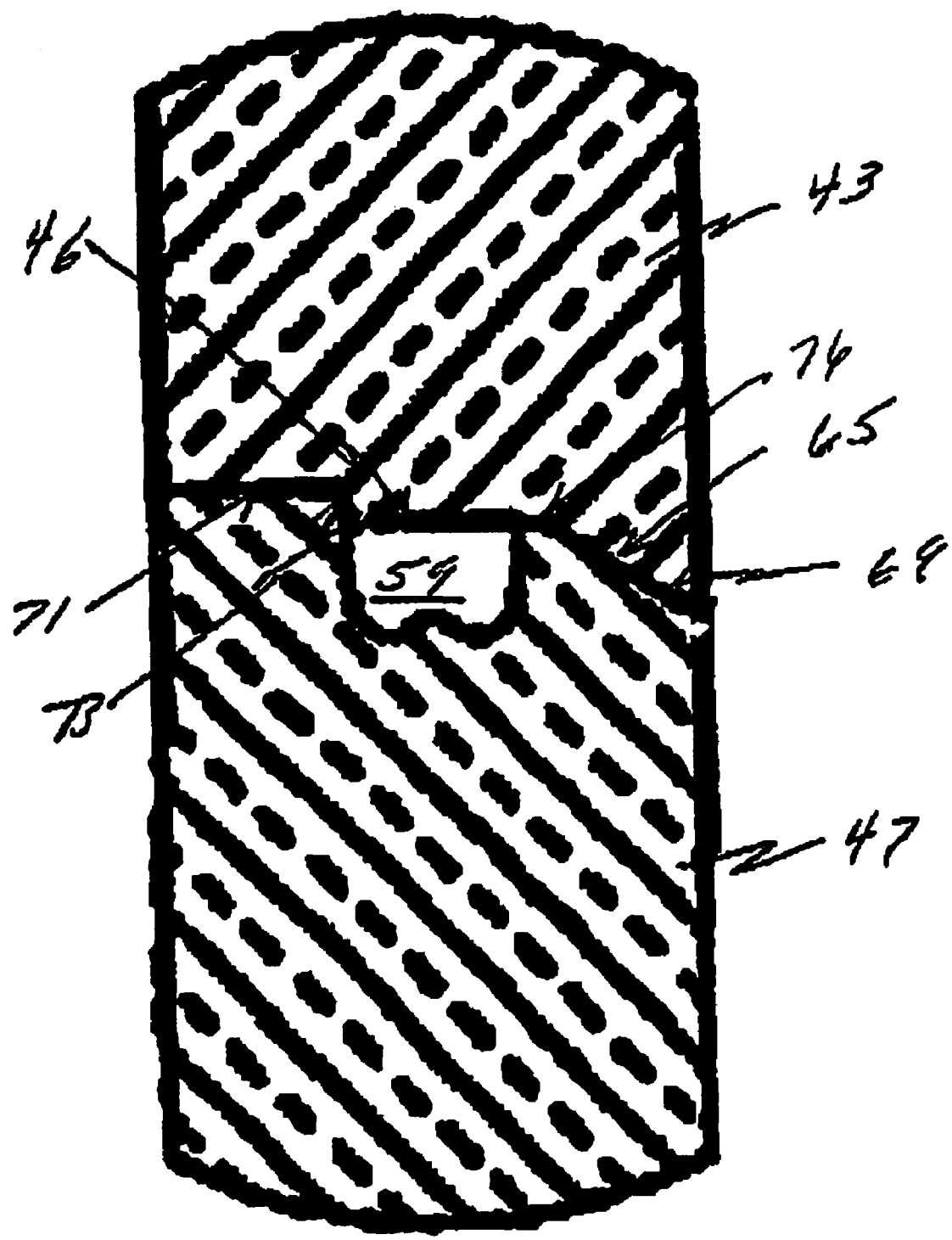
FIG. 8 is a partial cross-sectional view of the straight and angled butt joints in a tunnel segment of the present invention shown in FIG. 7.
Figures 9, 10:
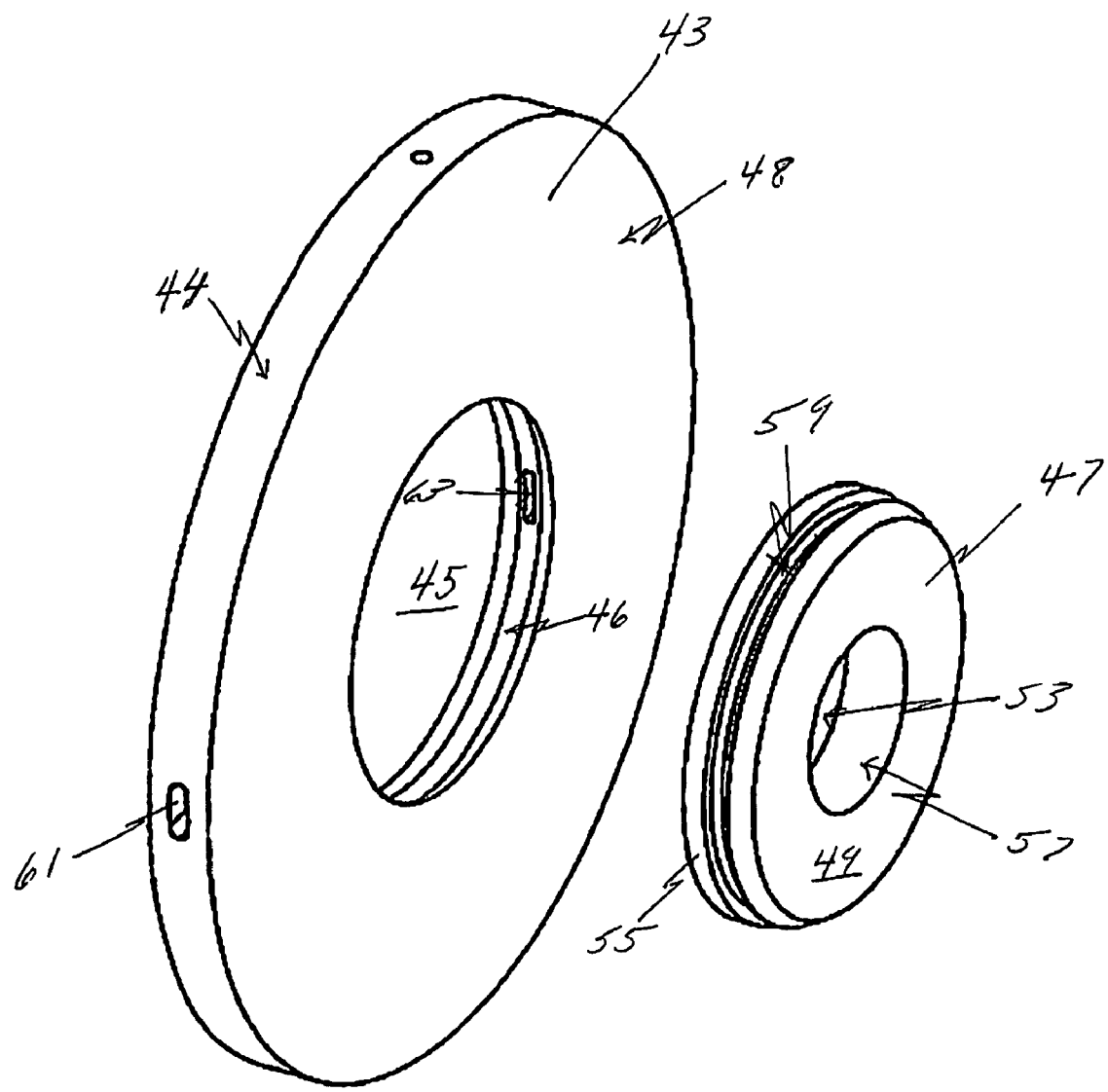
FIG. 9 is a perspective view of an outer disc used in forming the tunnel segment of the present invention.
FIG. 10 is a perspective view of an inner disc used in forming the tunnel segment of the present invention which can be positioned concentric with the disc shown in FIG. 9.

A tunnel segment according to the present invention is shown generally at 41 (FIGS. 4-8) and comprises an outer disc 43 having a central bore 45 (FIGS. 4 and 9), an outer edge 44 and an inner edge 46 (FIGS. 4 and 9).

Figure 6:
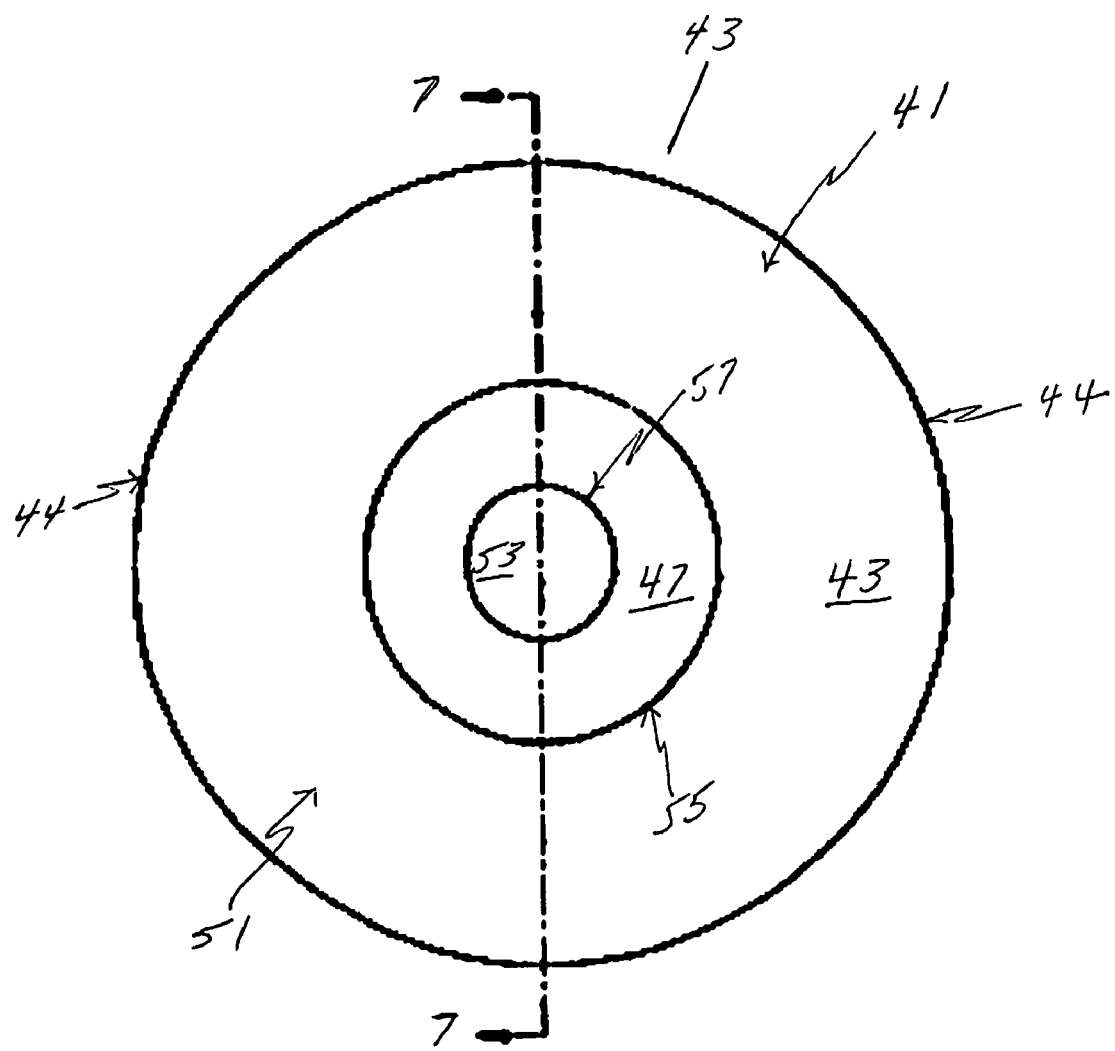
FIG. 6 is a top view of a tunnel segment of the present invention.
Figure 7:
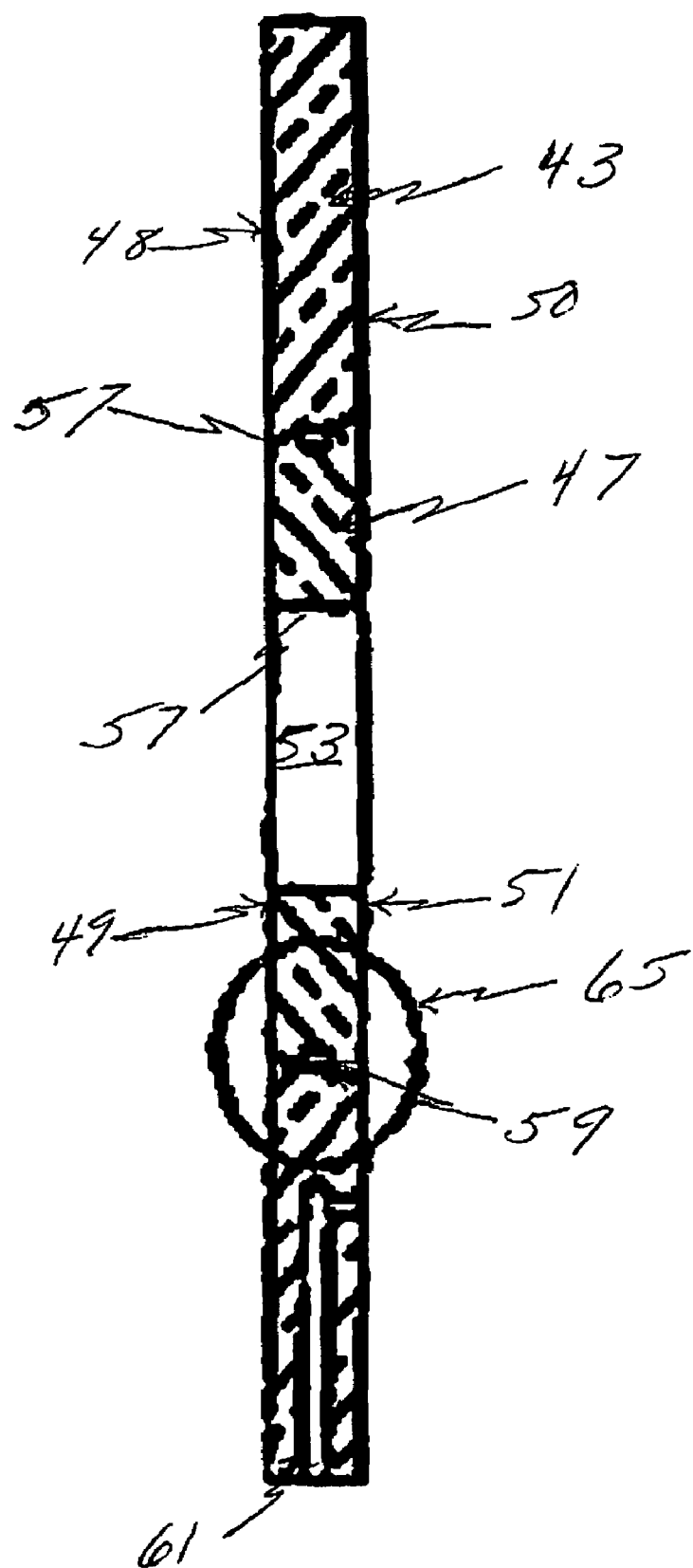
FIG. 7 is a cross-sectional view, taken along line 7-7 in FIG. 6, illustrating the groove in the inner disc and the shape of a straight and angled butt joints at the interface between the inner and outer discs forming the tunnel segment of the present invention.

An inner disc 47 (FIGS. 4-8 and 10) fits snugly in bore 45 of outer disc 43. Inner disc 47 has a top and bottom surfaces 49 and 51, respectively, a central bore 53, an outer and inner edges 55, 57, respectively, and a groove 59 formed in an outer edge 55 thereof (FIGS. 6, 7 and 10). The outer disc 43 is provided with an internal radially extending passage 61, 63 (FIG. 9) extending from an outer edge to an inner edge 46 so as to provide a passageway for coolant flowing to and from groove 59 (FIG. 10). Both passageways 61, 63 communicate with circular groove 59.

The outer and inner discs are joined into a unitary structure by a weld interface defined by two distinctly shaped weld joints: a straight butt joint and angled butt joint. The straight butt joint occurs on the side of the weld interface defined by the larger outer disc side 50 (FIG. 7) and smaller inner disc side 51 (FIG. 7) and is preferably perpendicular to both sides. The angled butt joint occurs on the side of the weld interface defined by the outer disc side 48 (FIG. 7) and the inner disc side 49 (FIG. 7) and is angled to both sides. The angle of the butt joint is defined from outer disc side 48, and is preferably between 30 and 60 degrees.

Figure 11:
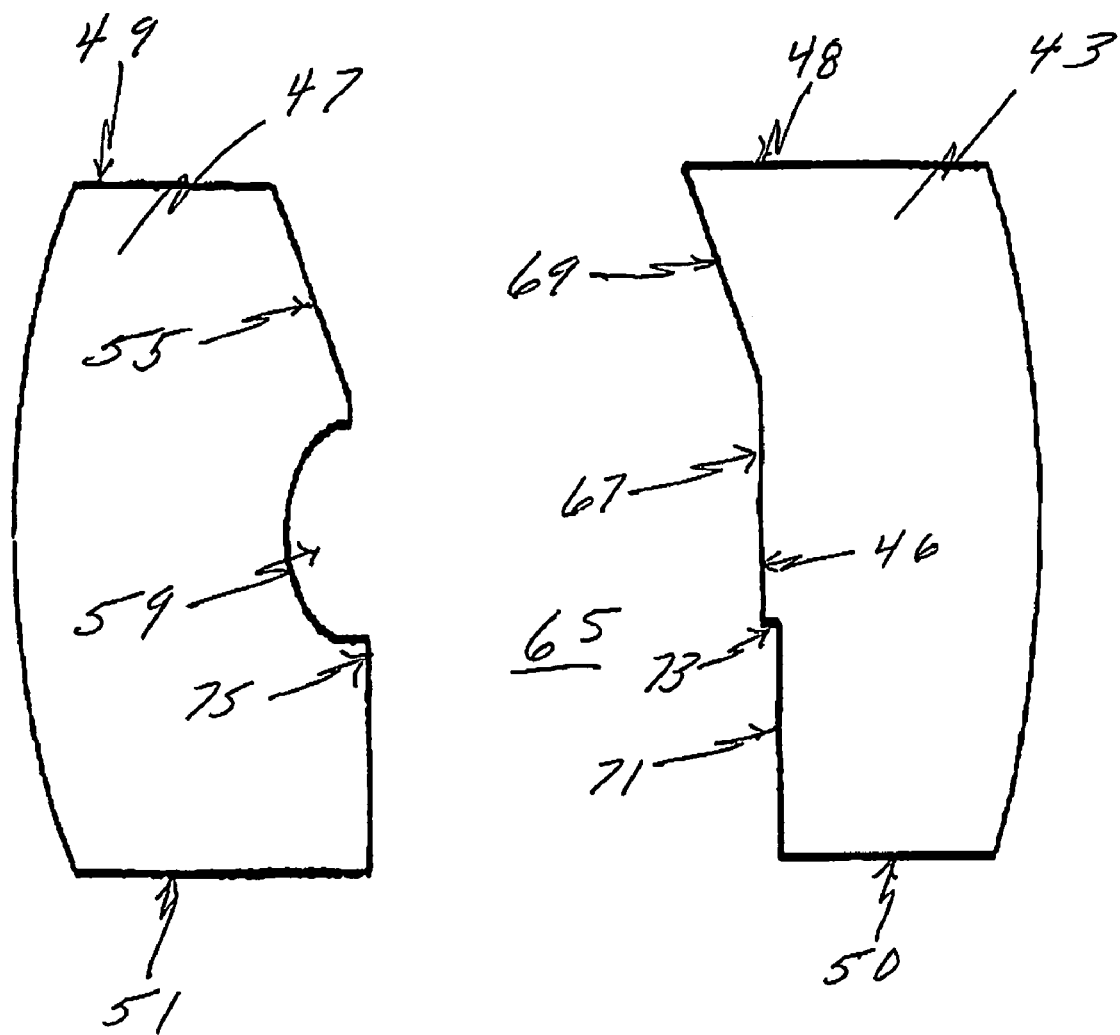
FIG. 11 is an enlarged partial sectional view of straight and angled butt joints used at the interface of the two concentric discs in the tunnel segment of the present invention, illustrating in greater detail the shape of the walls of the straight and angled butt joints.

The straight butt joint extends from outer disc side 50 and inner disc side 51 towards water passage 59 along a closely fitted interface 71 that s designed to aid the welding process. The straight butt joint ends near the water passage 59 at the weld stop 73 (FIGS. 8 and 11). Similarly, the angled butt joint extends from the outer disc side 48 and inner disc side 49 towards the water passage 59 along a closely fitted interface 69 (FIG. 8) to aid in the welding process. The angled butt joint ends near the water passage 59 at the weld stop 76 (FIGS. 8 and 11). The entire weld interface between the outer disc and inner disc is comprised of these two different joint types.

The straight and angled butt joints 65 (FIGS. 7, 8 and 11) are formed between outer disc 43 and inner disc 47 at the inner edge surface 46 of outer disc 43 (FIG. 9). At the straight and angled butt joints all edge surfaces of the inner and outer discs 47, 43, respectively, are in abutting engagement except at the groove 59 of inner disc 47 (FIGS. 4, 7 and 8).

At the groove 59, an inner edge 46 of the outer disc 43 contacts edges of groove 59 to form an outer wall of a coolant passageway at straight and angled butt joints 65 (FIGS. 7, 8 and 11).

A first surface 67 of an inner edge 46 of outer disc 43 extends entirely across and walls off groove 59 formed in outer edge of inner disc 47 (FIG. 11), whereby to close off groove 59 and form a circular passageway (FIGS. 4-11) for coolant flow.

At the straight and angled butt joint 65, a second surface 69 of the inner edge 46 of outer disc 43 extends from an outer side of the larger disc at an angle of from about 30 to 60 degrees.

At the straight and angled butt joint 65, a third surface 71 at inner edge 46 of outer disc 43 includes a recess or corner 73 which is in abutting engagement with shoulder 75 formed in an outer edge 55 (FIG. 10) of inner disc 47. The third surface 71 of the inner edge extends from an outer surface 50 of outer disc 43, preferably at an angle of about 90 degrees to the recess or corner 73 (FIG. 11).

Figure 12:
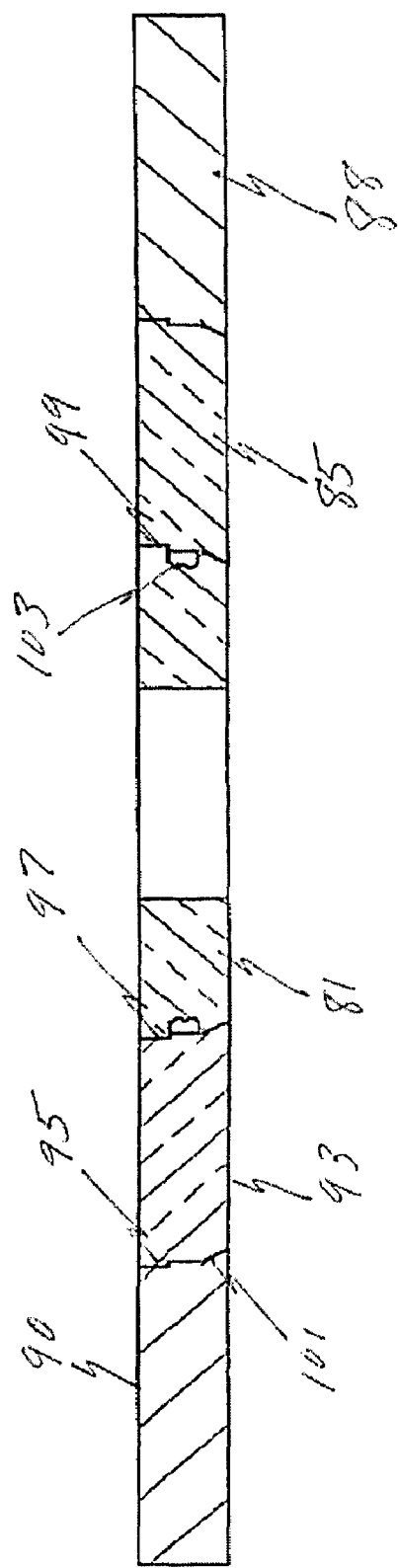
FIG. 12 is a cross-sectional view of another tunnel segment of the present invention, illustrating the use of three concentric discs to form the tunnel segment.

In a preferred embodiment, three or more concentric discs may be used to form a tunnel segment. As an example, a segment may be constructed from an inner disc 81, a center disc 85, and an outer disc 88 (FIG. 12). Concentric discs 81, 85 and 88 are parallel on two sides 90, 93, and are fitted together using two weld interfaces 95, 97 which are comprised of a straight butt joint 99 and an angled butt joint 101 (FIG. 12).

In this case, a water passage 103 exists between the center disc 85 and the inner disc 81. The radially extending passages 61, 63 (FIG. 9) (not shown in FIG. 12) pass through both the center disc and outer disc so as to facilitate the flow of water to the circular water passage 103 at inner disc 81 (FIG. 12).

In another preferred embodiment, a tunnel segment consisting of n discs and (n−1) weld interfaces can be used. This multiple disc construction is preferred in constructing segments having diameters over 10 inches, and is only limited by the physical constraints of the welding process.

This straight and angled butt joint design of the present invention reduces the multiple tight tolerance dimensions of a double step straight butt joint design to one angled dimension that has a tight tolerance, namely, the angled face. Additionally, the straight and angled butt joints retain weld stops required for full weld penetration into outer disc 43.

Also, the straight and angled butt joint design of the present invention adds one more important feature, i.e., self-centering of the inner and outer discs during fabrication. This feature has the unique characteristic to reduce complicated pre-weld assembly fit-up by providing a built-in method to insure that the concentric inner and outer discs are parallel and in alignment based on the parallelism of the angled and straight interfaces. Unlike a straight interface, the two concentric discs find coincident "centers" during fit-up, and are typically less likely to bind or have gaps before welding. The two concentric discs can also be assembled prior to a pre-heating operation, and will adjust relative to one another as each expands during heating.

The straight and angled butt joint configuration of the present invention thus employs dual weld stops that allows full weld penetration without leaving any weldment in the coolant passage which, in the conventional tunnel segments, reduces water flow therethrough as well as heat transfer. Thus, the performance assessment of the angled butt joint of the present invention relies heavily on the dual weld stop configuration that provides proper weld stops for both sides of weld joints defined by the straight and angled butt joints. In actual water tests, the straight and angled butt joint design showed substantially reduced water passage weld flow through, and was found to have excellent weld cap characteristics.

What is claimed is:

1. In a plasma heated arcjet wind tunnel comprising a plurality of spaced disc shaped tunnel segments that provide spacing between an anode and cathode in a plasma heated tunnel, the improvement comprising:
   tunnel segments comprising two concentric discs each having a central bore, a larger outer disc and a smaller inner disc which fits snugly in the central bore of the larger outer disc, each disc having inner and outer edge surfaces and substantially parallel top and bottom surfaces, the inner disc having a groove formed in its outer edge, the outer disc having an internal radial passage extending from its outer edge to its inner edge and communicating with the groove formed in the outer edge of the inner disc, said inner and outer concentric discs being joined at a welded interface comprising a straight butt joint and an angled butt joint, said joints withstanding the passage of high pressure coolant flow, at the straight and angled butt joints all edge surfaces of the inner and outer discs are in abutting engagement except at the groove.

2. The plasma arcjet wind tunnel of claim 1, wherein the tunnel segments are formed at least in part from oxygen free copper, copper alloy, or combination of copper alloys and corrosion resistant steels.

3. The plasma arcjet wind tunnel of claim 1, wherein a bore in the center of the smaller disc accommodates the flow of a plasma in the wind tunnel.

4. The plasma arcjet wind tunnel of claim 1, wherein the straight and angled butt joints are joined using electron beam welding, laser welding, or friction stir welding.

5. The plasma arcjet wind tunnel of claim 1, wherein at the straight and angled butt joints a first surface of the inner edge of the larger disc extends entirely across and walls off the groove formed in an outer edge of the inner disc, whereby to form a circular coolant passageway.

6. The plasma arcjet wind tunnel of claim 5, wherein at the straight and angled butt joints a second surface of the inner edge of the larger disc extends from an outer side of the larger disc at an angle of from about 30 to 60.

7. The plasma arcjet wind tunnel of claim 6, wherein at the straight and angled butt joints a third surface of the inner edge of the larger disc includes a recess or corner which is in abutting engagement with a shoulder formed on an outer edge of the inner disc, said third surface of the inner edge extending from an outer surface of the larger disc to said recess or corner.

8. The plasma arcjet wind tunnel of claim 6, wherein at the straight and angled butt joints the first surface is larger than the groove and extends from the groove to the second surface of the inner edge.

9. The plasma arcjet wind tunnel of claim 1, wherein at the straight and angled butt joints:
   (a) a first surface of the inner edge of the larger disc extends entirely across and walls off the groove formed in an outer edge of the inner disc, whereby to form a circular coolant passageway,
   (b) a second surface of the inner edge of the larger disc extends from an outer side of the larger disc at an angle of from about 30 to 60 degrees to said first surface of the inner edge,
   (c) a third surface of the inner edge of the larger disc includes a recess or corner which is in abutting engagement with a shoulder formed on an outer edge of the inner disc, said third surface of the inner edge extending from an outer surface of the larger disc to said recess or corner, and
   (d) the first surface is larger than the groove and extends from the groove to the second surface.

10. Tunnel segment employed in a plasma heated arcjet wind tunnel comprising:
   two concentric discs each having a central bore, a larger outer disc and a smaller inner disc which fits snugly in a central bore of the larger outer disc, each disc having inner and outer edge surfaces and substantially parallel top and bottom surfaces, the inner disc having a groove formed in its outer edge, the outer disc having an internal radial passage extending from its outer edge to its inner edge and communicating with the groove formed in the outer edge of the inner disc, said inner and outer concentric discs being joined by a welded straight and angled butt joints so as to withstand the passage of high pressure coolant flow, at the straight and angled butt joint all edge surfaces of the inner and outer discs are in abutting engagement except at the groove.

11. The tunnel segment of claim 10, wherein the tunnel segment is formed at least in part from oxygen free copper, copper alloy, or combination of copper alloys and corrosion resistant steels.

12. The tunnel segment of claim 10, wherein the bore in the center of the smaller disc accommodates the flow of a plasma in a plasma heated arcjet wind tunnel.

13. The tunnel segment of claim 10, wherein the straight and angled butt joint is joined by electron beam welding, laser welding, or friction stir welding.

14. The tunnel segment of claim 10, wherein at the straight and angled butt joint a first surface of the inner edge of the larger disc extends entirely across and walls off the groove formed in an outer edge of the inner disc, whereby to form a circular coolant passageway.

15. The tunnel segment of claim 14, wherein at the straight and angled butt joint a second surface of the inner edge of the larger disc extends from an outer side of the larger disc at an angle of from about 30 to 60 degrees.

16. The arcjet tunnel segments of claim 15, wherein at the straight and angled butt joint a third surface of the inner edge of the larger disc includes a recess or corner which is in abutting engagement with a shoulder formed on an outer edge of the inner disc, said third surface extending from an outer surface of the larger disc to said recess or corner.

17. The arcjet tunnel segment of claim 15, wherein at the straight and angled butt joint the first surface is larger than the groove and extends from the groove to the second surface of the inner edge.

18. The tunnel segment of claim 10, wherein at the straight and angled butt joint:
(a) a first surface of the inner edge of the larger disc extends entirely across and walls off the groove formed in an outer edge of the inner disc, whereby to form a circular coolant passageway,
(b) a second surface of the inner edge of the larger disc extends from an outer side of the larger disc at an angle of from about 30 to 60 degrees,
(c) a third surface of the inner edge of the larger disc includes a recess or corner which is in abutting engagement with a shoulder formed on an outer edge of the inner disc, said third surface extending from an outer surface of the larger disc to said recess or corner, and
(d) the first surface is larger than the groove and extends from the groove to the second surface.

19. The tunnel segment of claim 10, wherein both the inner and outer discs are circular.

20. The tunnel segment of claim 10, wherein the straight and angled butt joint is joined by electron beam welding, laser welding, or friction stir welding.

* * * * *